Jan. 14, 1936.    J. H. HAMMOND, JR    2,027,530
NAVIGATIONAL GUIDE SYSTEM
Filed Nov. 15, 1932    13 Sheets-Sheet 1

INVENTOR
JOHN HAYS HAMMOND JR.
BY
ATTORNEY

Jan. 14, 1936.     J. H. HAMMOND, JR     2,027,530
NAVIGATIONAL GUIDE SYSTEM
Filed Nov. 15, 1932    13 Sheets-Sheet 2
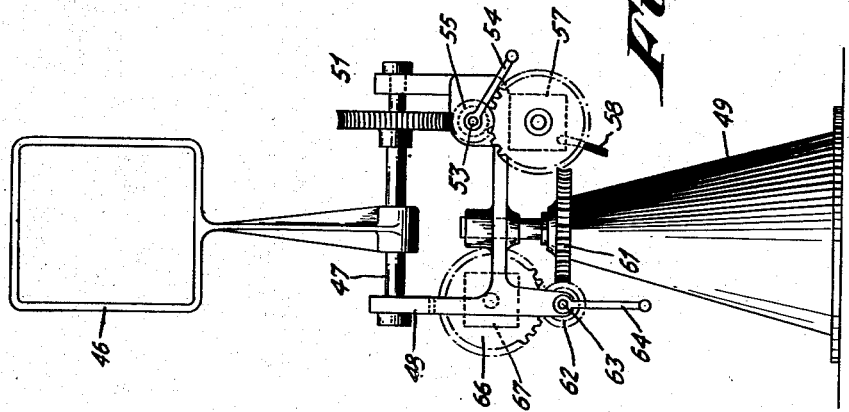
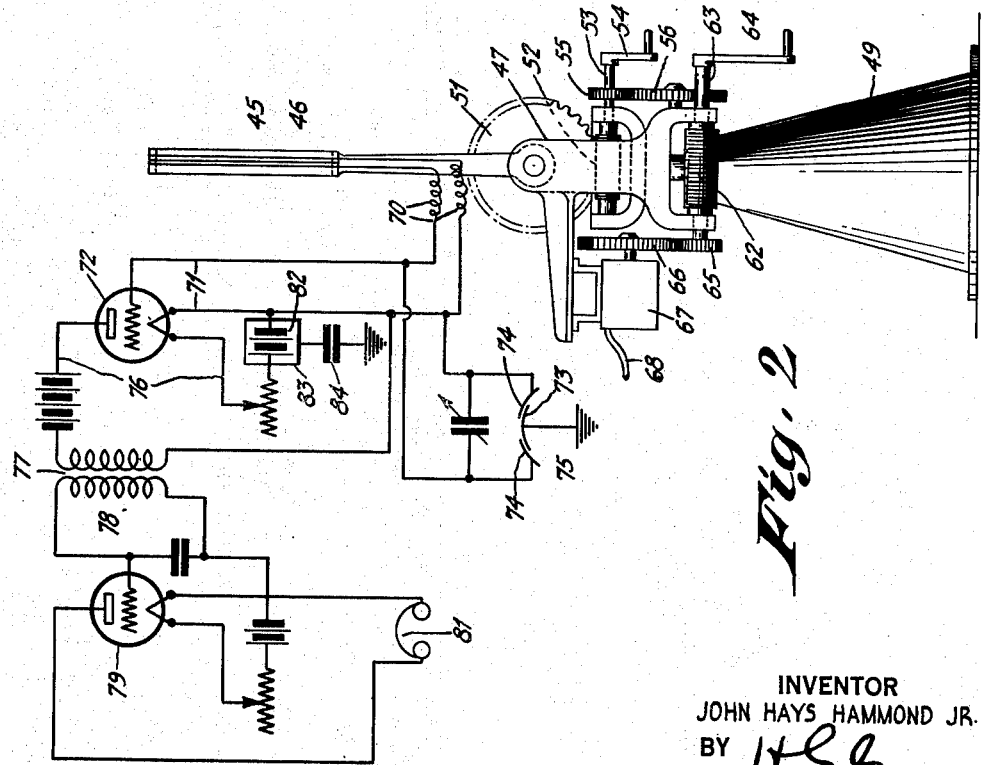
INVENTOR
JOHN HAYS HAMMOND JR.
BY
ATTORNEY

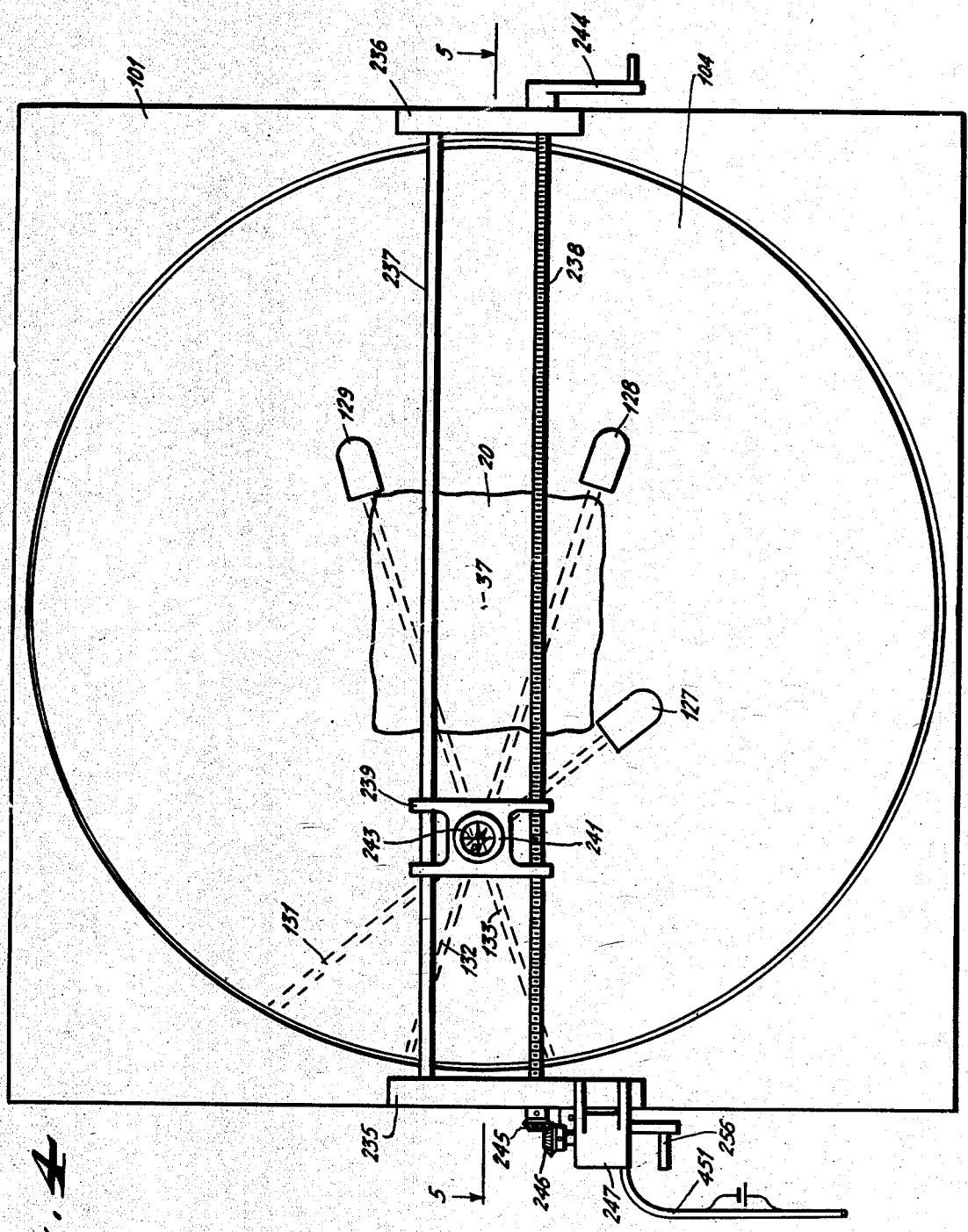

Jan. 14, 1936.  J. H. HAMMOND, JR  2,027,530
NAVIGATIONAL GUIDE SYSTEM
Filed Nov. 15, 1932  13 Sheets—Sheet 4
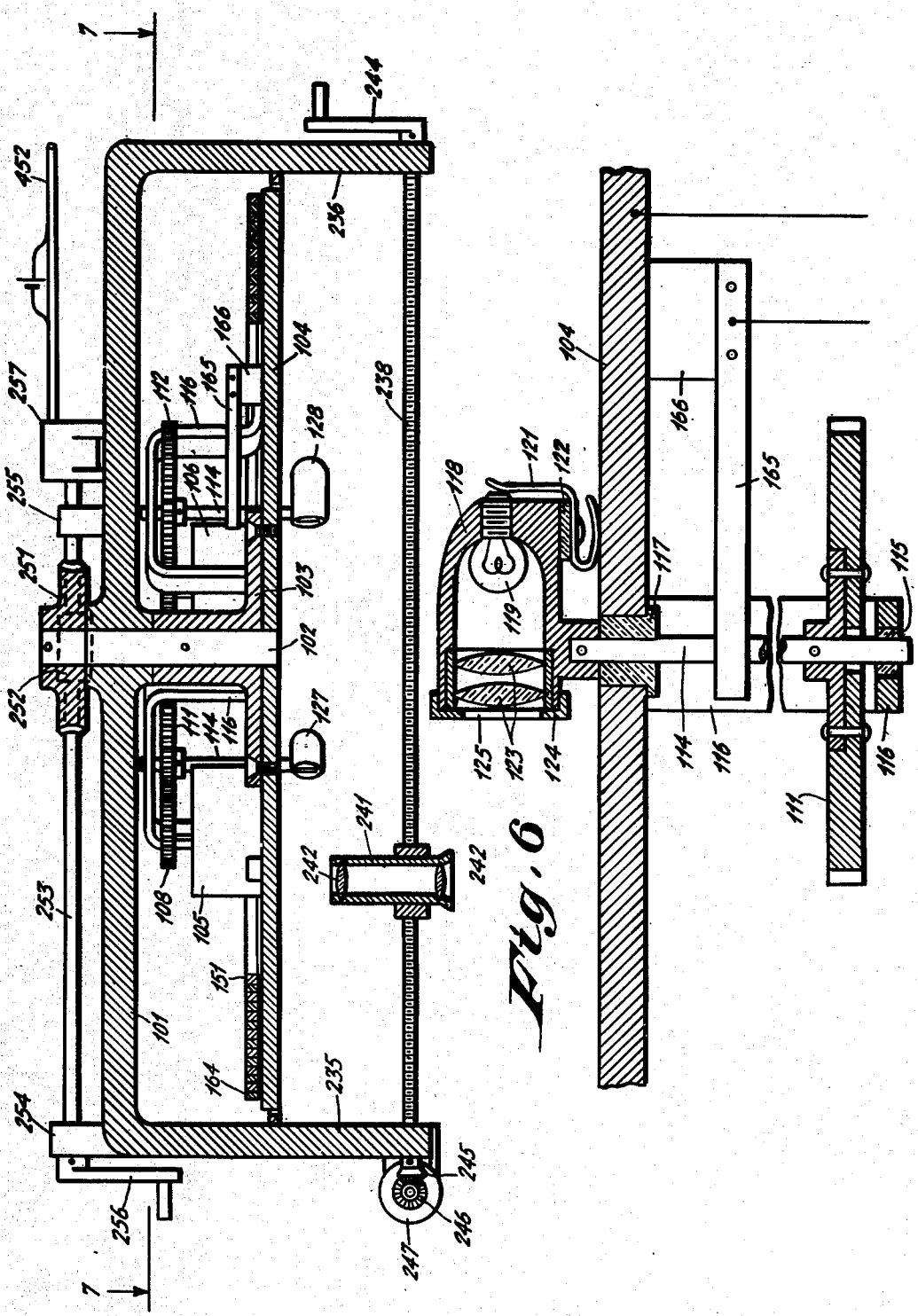
INVENTOR
JOHN HAYS HAMMOND JR.
BY
ATTORNEY Jan. 14, 1936.  J. H. HAMMOND, JR  2,027,530
NAVIGATIONAL GUIDE SYSTEM
Filed Nov. 15, 1932  13 Sheets-Sheet 5

INVENTOR
JOHN HAYS HAMMOND JR.
BY
ATTORNEY

Jan. 14, 1936.    J. H. HAMMOND, JR    2,027,530
NAVIGATIONAL GUIDE SYSTEM
Filed Nov. 15, 1932    13 Sheets-Sheet 6
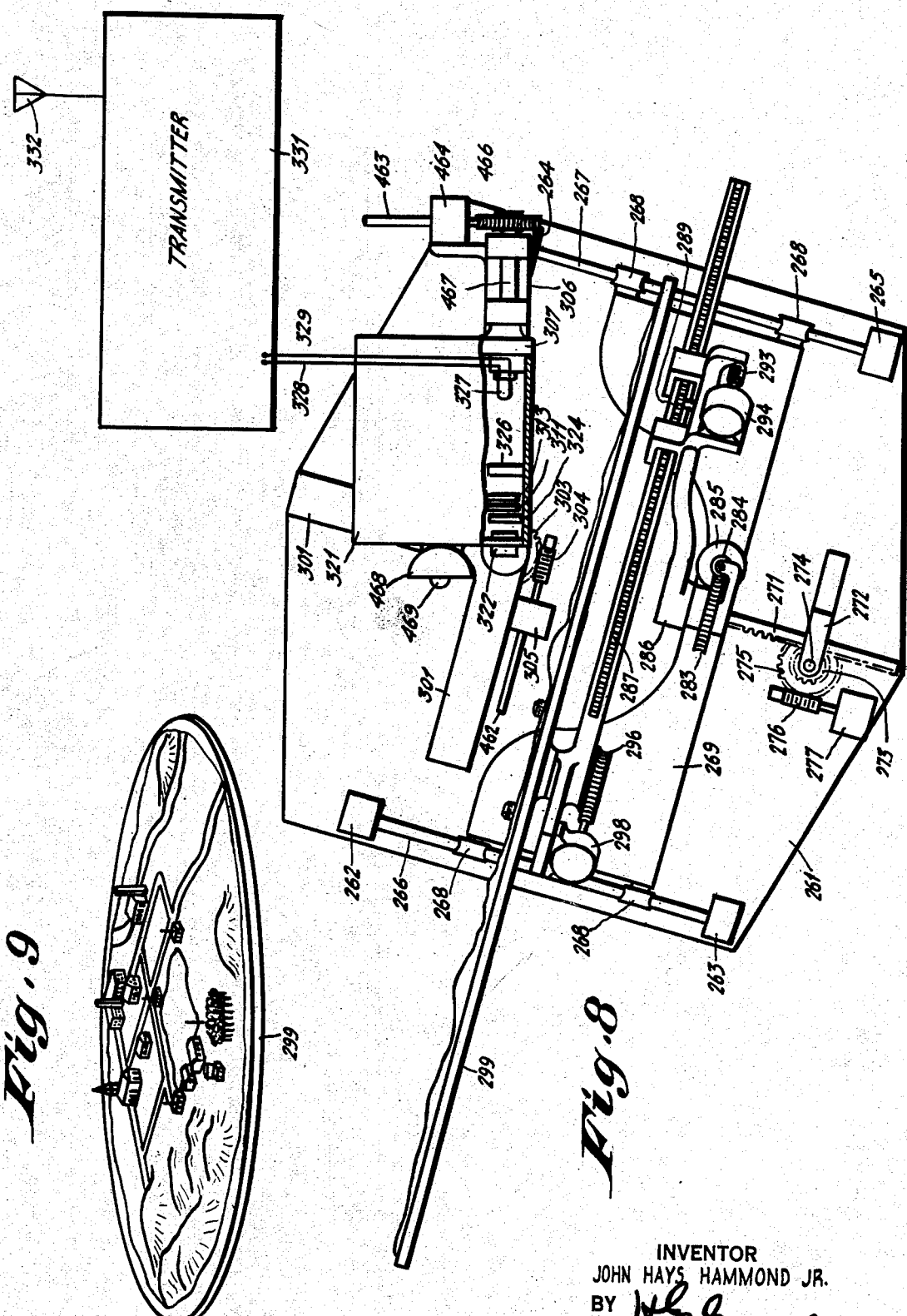
INVENTOR
JOHN HAYS HAMMOND JR.
BY H. G. Grover
ATTORNEY

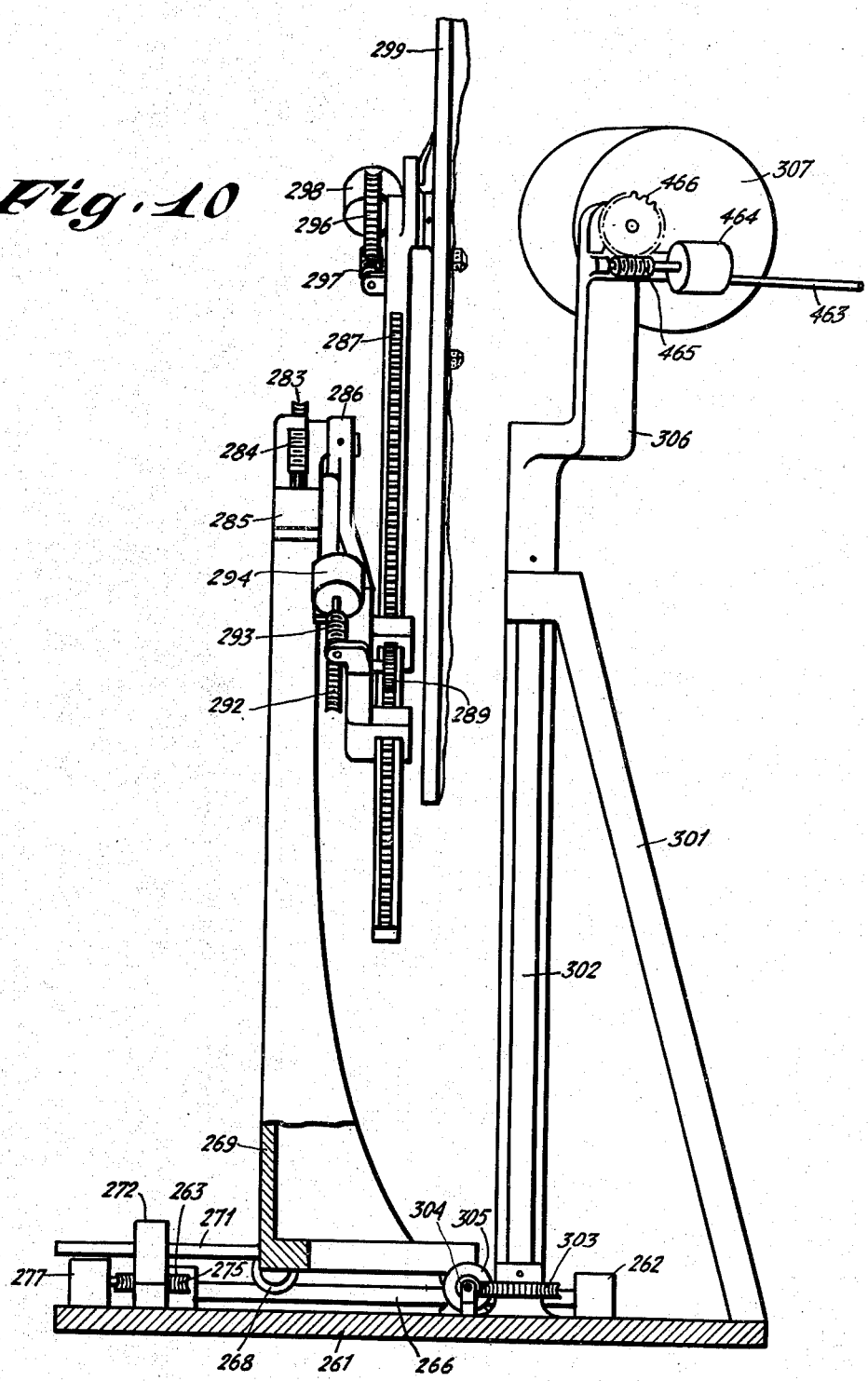

Jan. 14, 1936. J. H. HAMMOND, JR 2,027,530
NAVIGATIONAL GUIDE SYSTEM
Filed Nov. 15, 1932 13 Sheets-Sheet 8

INVENTOR
JOHN HAYS HAMMOND JR.
BY
ATTORNEY

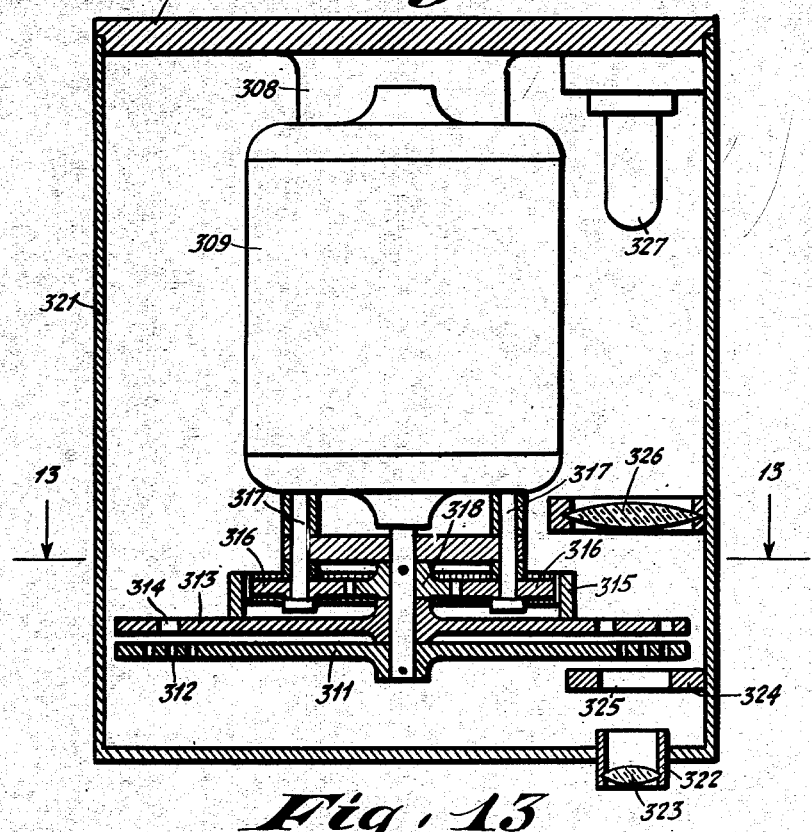
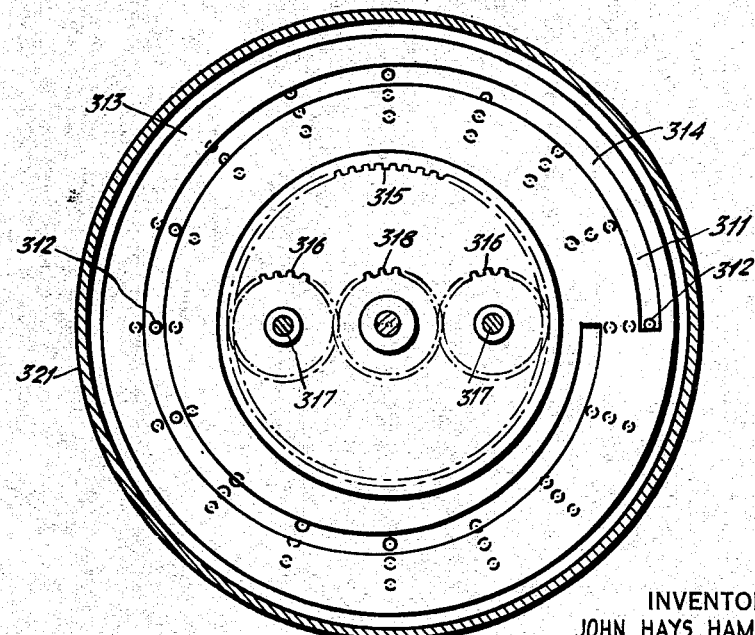

Jan. 14, 1936.    J. H. HAMMOND, JR    2,027,530
NAVIGATIONAL GUIDE SYSTEM
Filed Nov. 15, 1932    13 Sheets-Sheet 10
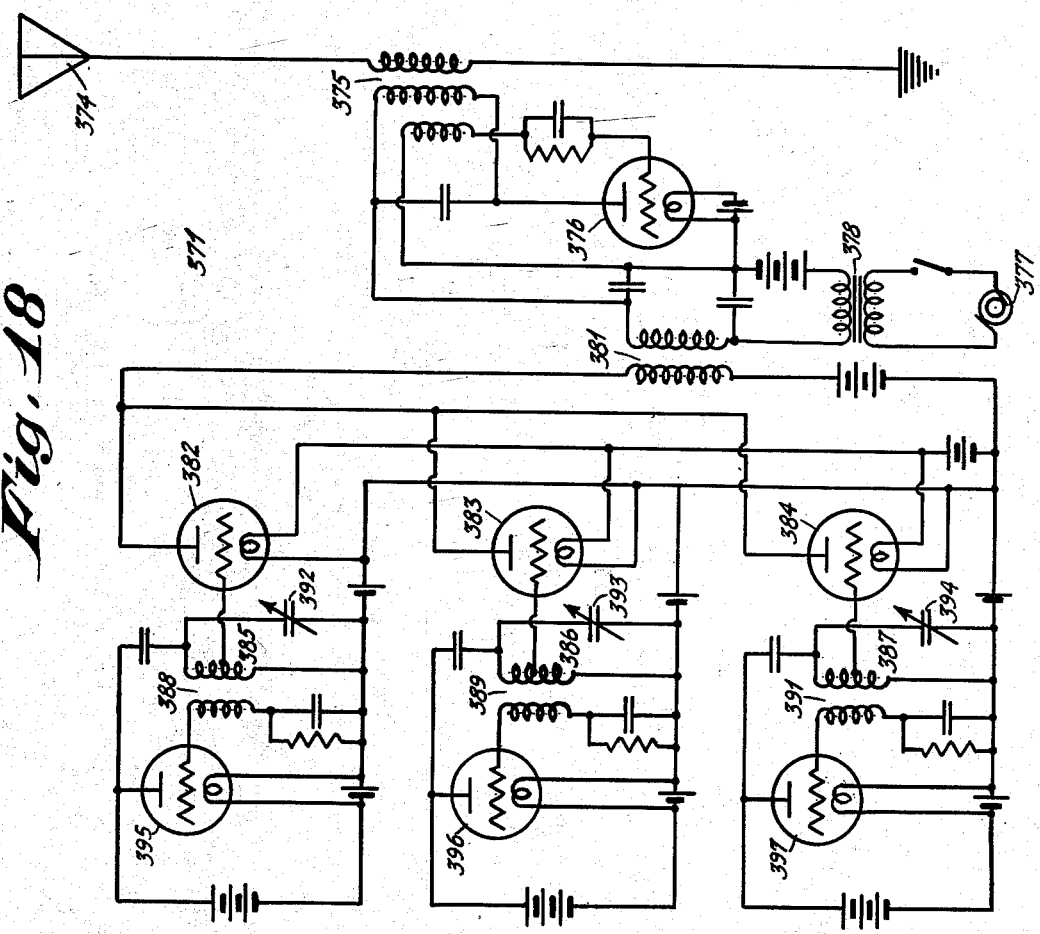
INVENTOR
JOHN HAYS HAMMOND JR.
BY
ATTORNEY Jan. 14, 1936.   J. H. HAMMOND, JR   2,027,530
NAVIGATIONAL GUIDE SYSTEM
Filed Nov. 15, 1932   13 Sheets-Sheet 11
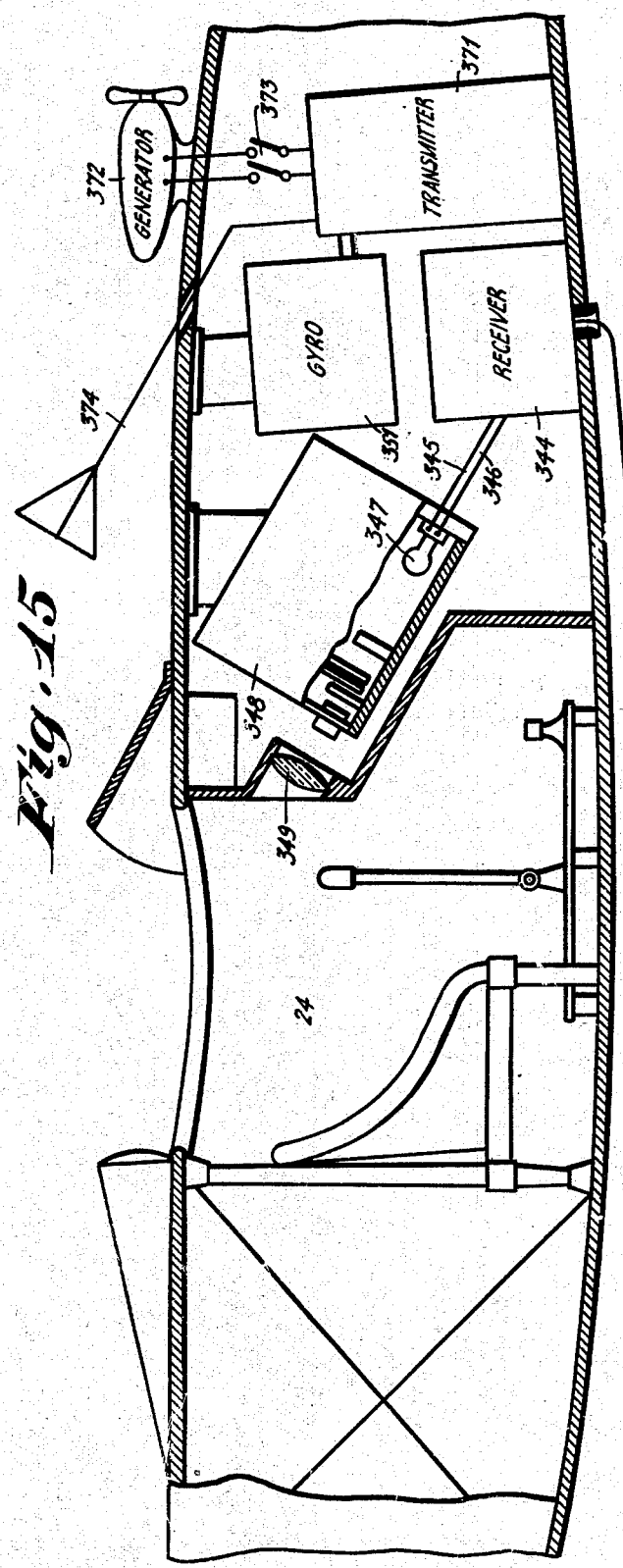
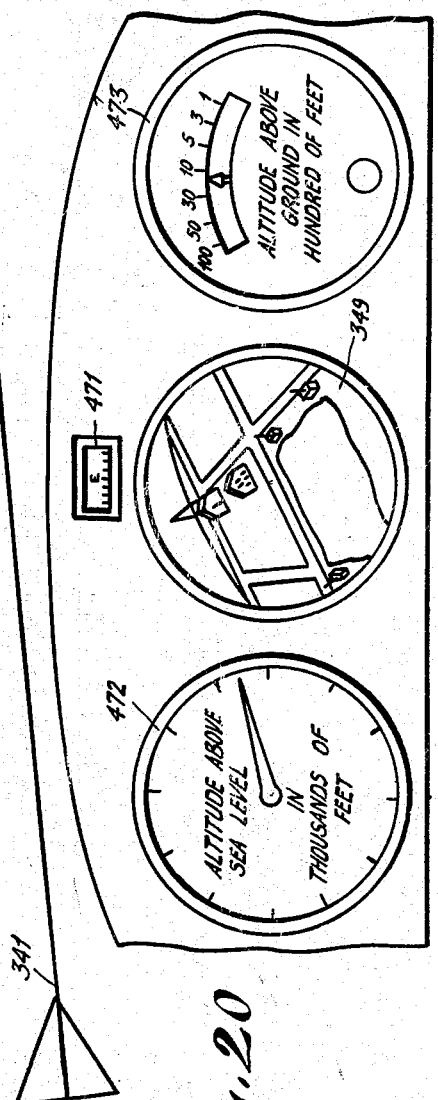
INVENTOR
JOHN HAYS HAMMOND JR
BY H G Grover
ATTORNEY Jan. 14, 1936. J. H. HAMMOND, JR 2,027,530
NAVIGATIONAL GUIDE SYSTEM
Filed Nov. 15, 1932 13 Sheets-Sheet 12

INVENTOR
JOHN HAYS HAMMOND JR.
BY H. S. Grover
ATTORNEY

INVENTOR
JOHN HAYS HAMMOND JR.
BY H.S. Grover
ATTORNEY

Patented Jan. 14, 1936

2,027,530

UNITED STATES PATENT OFFICE 2,027,530

NAVIGATIONAL GUIDE SYSTEM

John Hays Hammond, Jr., Gloucester, Mass., assignor to Radio Corporation of America, a corporation of Delaware Application November 15, 1932, Serial No. 642,712

13 Claims. (Cl. 250—11)

The invention relates to a navigational guide system, and more particularly to a system for designating to a pilot his bearings with reference to a fixed location.

The invention as specifically applied to an aeronautical guide system provides means whereby the aircraft pilot may be informed of his position with reference to a landing field, and is particularly adaptable in cases where the visibility is poor. This system is advantageous in cases where the aircraft is flying at night or in foggy weather, or when the clouds intervene between the aircraft and the land.

The present invention provides a system whereby the pilot of an aircraft is visually notified of the objects along a predetermined line of travel of his craft. In this system signals emanating from an aircraft are impressed upon a plurality of direction finders located at various fixed positions such as on a landing field. These direction finders are oriented in order to effect a predetermined responsiveness. A plotting mechanism is provided which is actuated in response to the orientation of said direction finders and which designates the position of the aircraft upon a disk which corresponds to the terrane of the landing field.

A television pick-up system is provided which has associated therewith a map of the field with the various characteristics thereof indicated preferably in relief. An element is also provided corresponding to the airplane. A relative movement of said element with respect to the relief map is effected corresponding to the movement of the airplane with respect to the field. This reproduction of the airplane movement by said element is effected in response to the actuation of the plotting mechanism and suitable altitude indicating devices. It is also effected by the orientation of the plane in azimuth, the angle of descent and the angle at which the plane is banked. The objects on the relief map in the line of travel of the element in this system is then transmitted to the pilot of the aircraft by television.

Through the agency of the present invention the pilot can continuously observe the objects on the field along his line of travel, obviating thereby a possible collision with said objects. In this way the airplane and pilot can effect a safe landing.

This invention has been described with reference to its application to an aircraft, but it is obvious that it can be applied equally as well to any other moving craft, such as a boat, submarine, etc.

The invention also consists in certain new and original features of construction and combinations of parts hereinafter set forth and claimed.

Although the novel features which are believed to be characteristic of this inveniton will be particularly pointed out in the claims appended hereto, the invention itself, as to its objects and advantages, the mode of its operation and the manner of its organization may be better understood by referring to the following description taken in connection with the accompanying drawings forming a part thereof, in which, Figure 1 shows a bird's-eye view of a landing field and surrounding country;

Figure 2 is a side elevation of one of the direction finders with its associated receiving system;

Figure 3 is a front elevation of one of the direction finders;

Figure 4 is a front elevation of the plotting mechanism;

Figure 5 is a sectional view on line 5—5 of Figure 4;

Figure 6 is a detail view of the light source of the plotting mechanism indicated in Figure 5;

Figure 8 is a top plan view partly in section of the television pick-up system;

Figure 9 is a perspective view showing details of the relief map associated with Figure 8;

Figure 10 is a side elevation of the television pick-up system;

Figure 12 is a plan view partly in section of the television apparatus;

Figure 13 is a section taken on line 13—13 of Fig. 12;

Figure 14 is a diagrammatic view of the television receiver used in the aircraft;

Figure 15 is a section taken through the aircraft showing details of the television receiving system;

Figure 18 illustrates diagrammatically the circuits that may be used in transmitting angles from the aircraft;

Like reference characters denote like parts in the several figures of the drawings.

In the following description and in the claims parts will be identified by specific names for convenience, but they are intended to be as generic in their application to similar parts as the art will permit.

Figure 1:
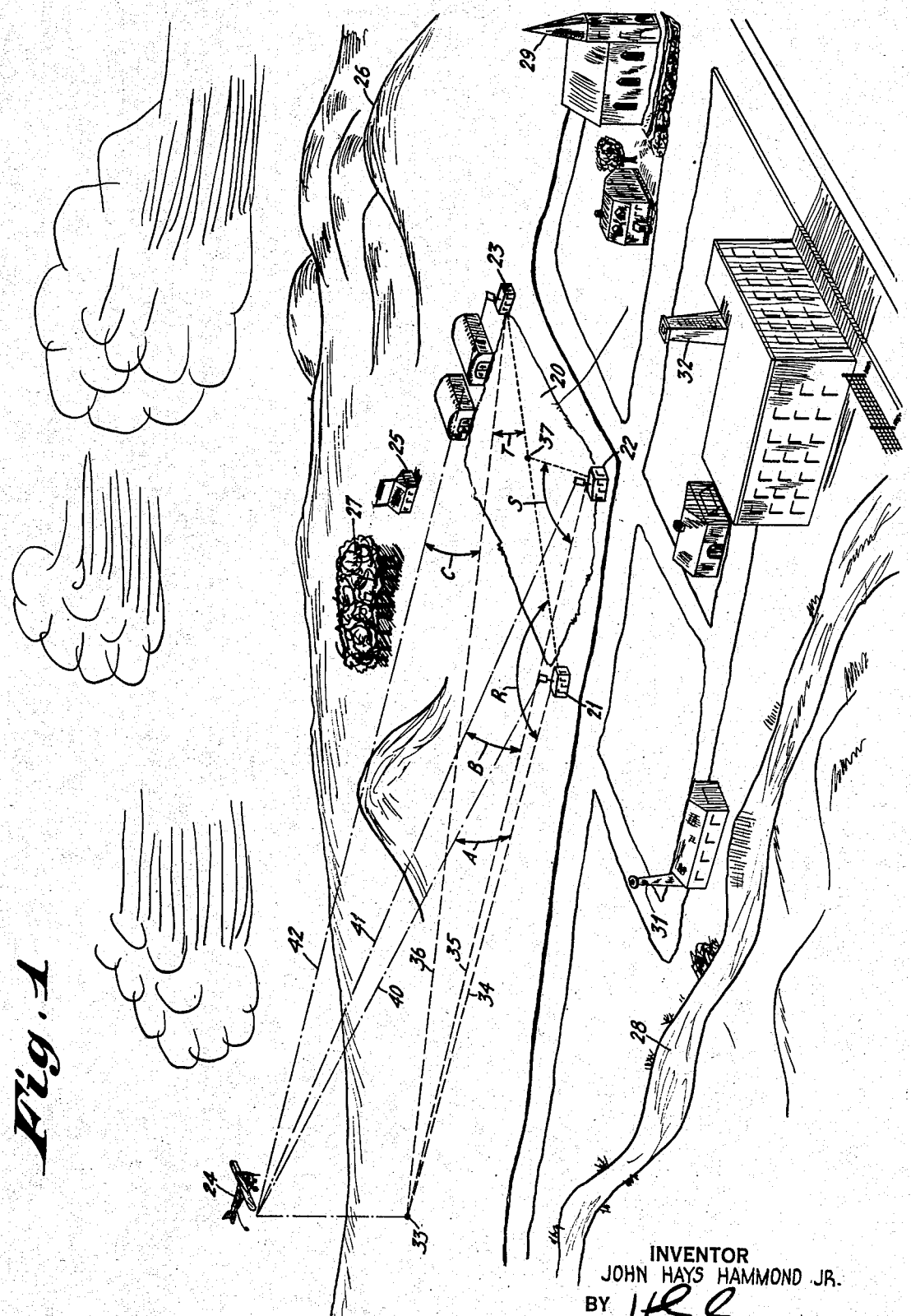

In the adaptation of the invention to an aeronautical system shown in Figure 1, the landing field is indicated at 20, and the three direction finder stations at 21, 22 and 23. The approaching airplane is shown at 24, and the television transmitting station at 25. Other objects of the landscape are shown, such as a hill 26, a forest 27, river 28, a church steeple 29, and two tall chimneys 31 and 32.

The projection of the airplane on the surface of the earth is indicated at a point 33. Joining this point with the three direction finder stations are three lines 34, 35 and 36 which form azimuth angles R. S. T. with lines drawn from the direction finder stations to the center of the field 37. From the plane, three lines, 40, 41 and 42 are drawn to the three finder stations. These lines form elevation angles A, B, and C with the lines 34, 35 and 36 respectively.

The airplane 24 transmits a wireless signal which is picked up by the direction finder shown in Figures 2 and 3. This direction finder consists of a pick-up device in the form of a coil 45, wound around a frame of insulating material 46, which is rigidly secured to a shaft 47. This shaft has bearings in a frame 48, which is pivotally mounted on a base 49. Secured to the shaft 47 is a worm wheel 51, which meshes with the worm 52, mounted on a shaft 53, which has bearings in the frame 48. To this shaft is fastened a handle 54, and a gear 55 which meshes with a second gear 56 carried by the shaft of an electrical transmitter 57, connected to an electrical cable 58.

Any suitable transmitter and its associated repeater may be used such as are fully described in Patent No. 1,431,140 issued October 3, 1922 and indicated in Figs. 18, 19, 20, and 21 of said patent.

Secured to the base 49 is a worm wheel 61 meshing with the worm 62, mounted on a shaft 63, which has bearings in the frame 48. Secured to one end of the shaft 63 is a handle 64, and to the other end is a gear 65, which meshes with a second gear 66 mounted on the shaft of an electrical transmitter 67 which is connected to an electrical cable 68.

One form of direction finder has been herein described, but it is obvious that any other suitable form of direction finder can be applied equally as well to the present invention.

The coil 45 is connected by flexible conductors 70 to the input circuit 71 of space discharge device 72. A balancing condenser 75 is provided with a pair of stationary plates 74 which are connected to the two terminals of coil 45 and with a movable plate 73 which is connected to ground. Output circuit 76 of space discharge device 72 may be connected through transformer 77 to the input circuit 78 of a second space discharge device, or amplifier 79, the output of which is connected to head phone 81 or other indicating means. Battery 82 which is connected to the filament of space discharge device 72 is preferably enclosed in a shield 83 which is connected through a condenser 84 to ground.

In the operation the balancing condenser 73 is adjusted, so that the coil 45 when properly balanced produces no response in the receiver 81 when the coil 45 is rotated into a plane normal to the direction of the receiving signals.

The above described pick-up circuit has been shown by way of illustration only, but it is to be understood that coil 45 may be connected to any suitable radio receiving circuit which is capable of receiving the radiant energy signals intercepted by said coil 45 and converting the same into a form suitable for actuating an inducting device.

The plotting mechanism shown in Figs. 4 to 7 consists of a frame 101 in which is rotatably mounted a shaft 102. Pinned to the shaft 102 is a bracket 103 upon which is mounted a disk 104.

Secured to the disk 104 are three electrical repeaters 105, 106 and 107. These are similar to the type described in Patent No. 1,431,140 previously referred to. Secured to the shafts of these repeaters are three pinions 108, 109 and 110 which mesh with three gears 111, 112 and 113. These gears are mounted on shafts 114 (see Fig. 6) which are mounted in insulating bushings 115, carried by brackets 116. These shafts are also mounted in insulating bushings 117 in the plate 104. Secured to the end of the shaft 114 is a light casing 118, within which is mounted a small incandescent lamp 119. Pressing against the central terminal of this lamp is a spring 121, which is mounted on a piece of insulation 122, carried by the light casing 118. This spring is always in contact with the metallic plate 104. Mounted in the end of the casing 118 is a suitable set of lenses 123, which cause the light from the lamp 119 to be formed into a parallel beam. Covering the opening of the casing 118 is a cap 124, which is provided with a slot 125 for causing this beam to be projected on the plate 104, as a narrow ray of light.

The three repeaters 105, 106 and 107 control the rotation of the three light projectors 127, 128 and 129, as seen in Fig. 4. The three beams of light emitted by the light projectors 127, 128 and 129 are shown in 131, 132 and 133 respectively. It will be noticed that the three light projectors are located in positions on the disk 104, which correspond to the positions of the direction finders 21, 22 and 23, with respect to the landing field 20.

Figure 7:
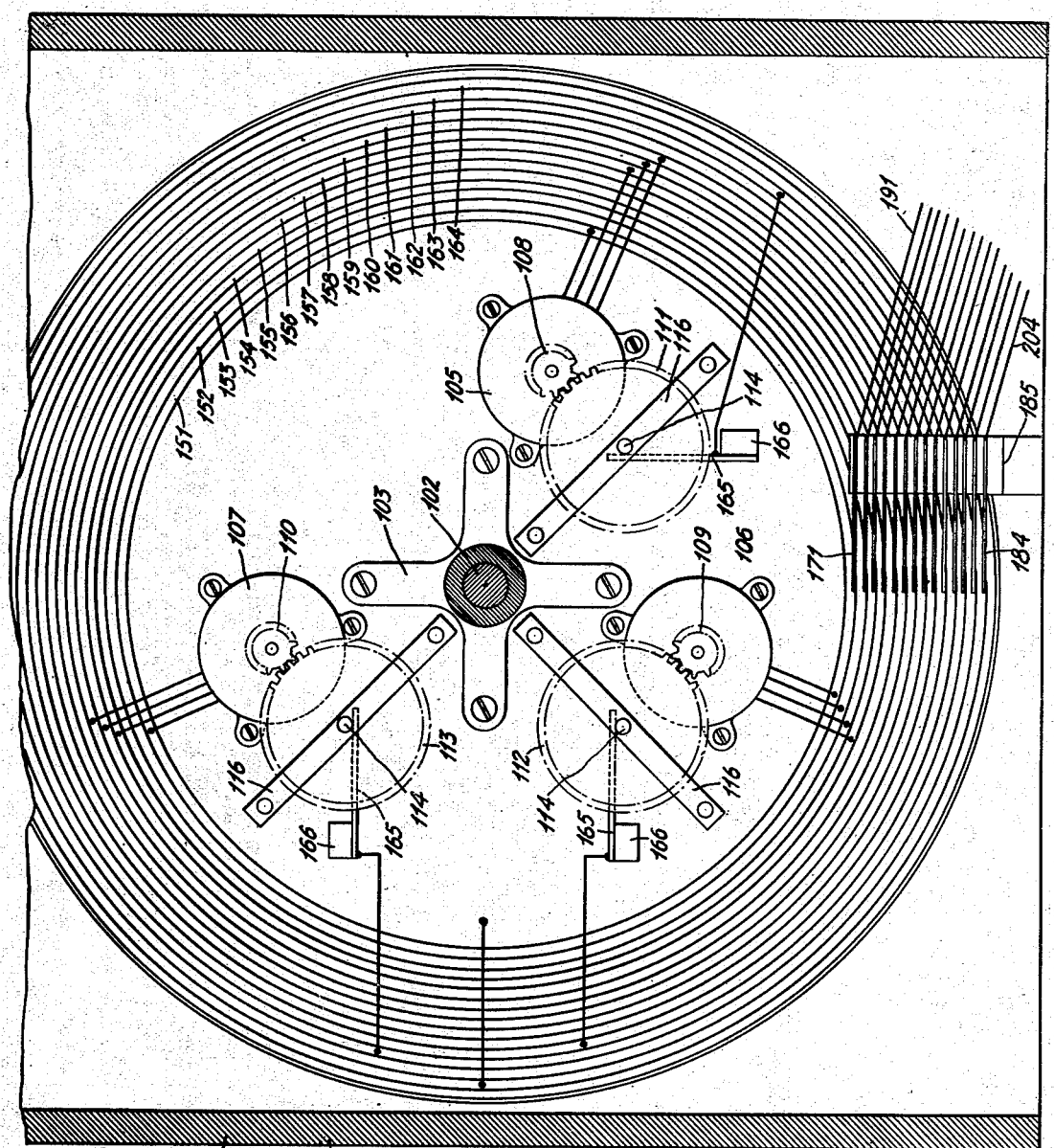
Figure 7 is a section taken on line 7—7 of Fig. 5.

On the back of the plate 104 are mounted 14 circular segments of conducting material 151 to 164, (see Fig. 7). The segment 151 is connected to the three common return wires of the repeaters 105, 106 and 107. The segments 152, 153 and 154 are connected to the other three wires of the repeater 106. The segments 155, 156 and 157 are connected to the other three wires of the repeater 107, and the segments 158, 159 and 160 are connected to the other three wires of the repeater 105. The segment 161 is connected to a contact brush 165, which is carried by a piece of insulation 166, mounted on the disk 104. This contact brush engages the shaft of the gear 112. The contact segment 162 is connected to a similar brush engaging the shaft of the gear 113, and the contact segment 163 is connected to a third brush, engaging the shaft of the gear 111. The contact segment 164 is connected to the plane 104. Engaging the 14 contact segments 151 to 164 are 14 brushes, 171 to 184, which are connected to 14 conductors 191 to 204. The brushes 171 to 184 are mounted on a block of insulating material 185, which is mounted on the frame 101.

The frame 101 is provided with two brackets 235 and 236 in which is rigidly mounted a rod 237. Rotatably mounted in the two brackets is a threaded shaft 238. Mounted on the rod 237 and the shaft 238 is a slider 239 which has a corresponding designating member such as an eye piece 241. This eye piece is provided with a suitable magnifying lens system which may take the form of lenses 242. This eye piece is also provided with a set of cross hairs 243. The shaft 238 which is threaded through the slider 239 is provided at one end with a handle 244, and at the other end with a beveled gear 245 which meshes with a second beveled gear 246. The latter is mounted on the shaft of an electrical transmitter 247.

Secured to the shaft 102 is a worm wheel 251 which meshes with a worm 252. This worm is mounted on a shaft 253 which has bearings in brackets 254 and 255. To one end of this shaft is secured a handle 256, and to the other end an electrical transmitter 257.

In the pick-up system shown in Figs. 8–11, a base plate 261 is provided having four brackets 262, 263, 264 and 265 in which are mounted two rods 266 and 267. Resting on these rods are four grooved rollers 268, carried by a frame-work 269. Attached to this frame is a rack 271 which slides in a bracket 272 and meshes with a pinion 273 which is secured to a shaft 274. Also secured to this shaft is a worm wheel 275 which meshes with a worm 276 carried on the shaft of an electrical repeater 277.

Figure 11:
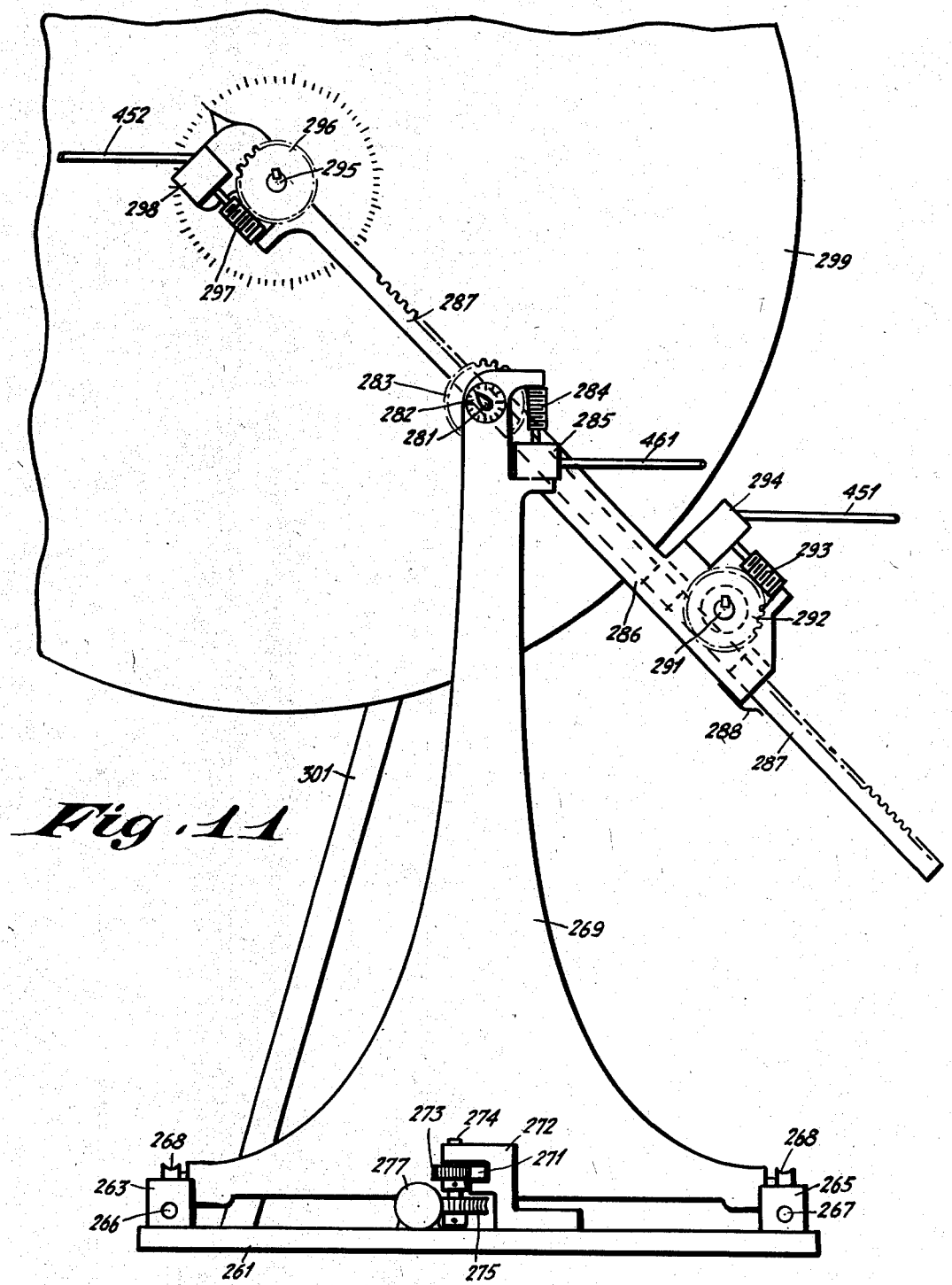
Figure 11 is a rear elevation of the television pick-up system.

Rotatably mounted in the upper end of the frame 269, see Figure 11, is a shaft 281 to which is secured a pointer 282 registering with a dial secured to the frame 269. Pinned to the shaft 281 is a worm wheel 283 which meshes with a worm 284 carried on the shaft of an electrical repeater 285. To the other end of the shaft 281 is pinned a member 286 in which is slidably mounted a rack 287. A pointer 288 registers with a scale engraved on the side of this rack. Meshing with this rack is a pinion 289 which is secured to a shaft 291 having bearings in the member 286. Pinned to this shaft is a worm wheel 292 which meshes with a worm 293 carried on the shaft of an electrical repeater 294. Rotatably mounted in the upper end of the rack 287 is a shaft 295 which has secured to one end thereof a worm wheel 296. Meshing with this is a worm 297 which is mounted on the shaft of an electrical repeater 298. Secured to the other end of the shaft 295 is a disk 299, on the other side of which is mounted a relief map of the landing field and surrounding country as shown in Fig. 9.

Mounted on the base 261 is a bracket 301 in which is rotatably mounted a shaft 302. To the lower end of this shaft is secured a worm wheel 303 which meshes with a worm 304 carried on the shaft of an electrical repeater 305. Secured to the upper end of the shaft 302 is a member 306, to the upper end of which is fastened a plate 307 (see Figure 12) which is provided with a bracket 308 on which is mounted a motor 309 which may be of any suitable type used for television apparatus and which is maintained at a constant speed by any well-known form of speed control. Secured to the end of the shaft of the motor 309 is a disk 311 which is provided with a series of holes 312 arranged in the form of a spiral. Loosely mounted on the shaft of the motor 309 is a second disk 313 which is provided with a spiral slot 314. Mounted on the back of the disk 313 is an internal gear 315 which meshes with two pinions 316 rotatably mounted upon two shafts 317 which are mounted on the frame of the motor 309. Secured to the shaft of this motor and meshing into the pinions 316 is a gear 318.

Surrounding the motor 309 and the disks 311 and 313 is a casing 321 which is attached to the base 307. Mounted in the end of this casing is an adjustable sleeve 322 in which is secured a lens 323. Mounted on the casing 321 and behind the sleeve 322 is a plate 324 provided with a rectangular opening 325 which is in line with the lens 323. Mounted behind the disks 311 and 313 is a lens 326 which focuses the light passing through these disks upon a photoelectric cell 327 which is mounted upon the base 307. This photoelectric cell is connected by two conductors 328 and 329 to a television transmitter 331, the output of which is connected to an antenna 332 (see Figure 8).

Located on the airplane 24 is an antenna 341 which is coupled through a transformer 342 and a filter circuit 343 to a short wave receiver 344 (see Fig. 14). This receiver is connected by two conductors 345 and 346 to a variable intensity lamp 347 mounted in a television reproducing apparatus 348 (see Fig. 15). This apparatus is essentially similar to the television scanning apparatus shown in Figs. 12 and 13 except that in this case the photoelectric cell 327 is replaced by the variable intensity lamp 347.

The motor of the television reproducing apparatus 348 is driven in synchronism with the motor 309, by any suitable synchronizing system. In front of the lens 323 of the television reproducing apparatus is a second lens 349 which is mounted on the instrument board of the airplane as shown in Fig. 20.

Figure 16:
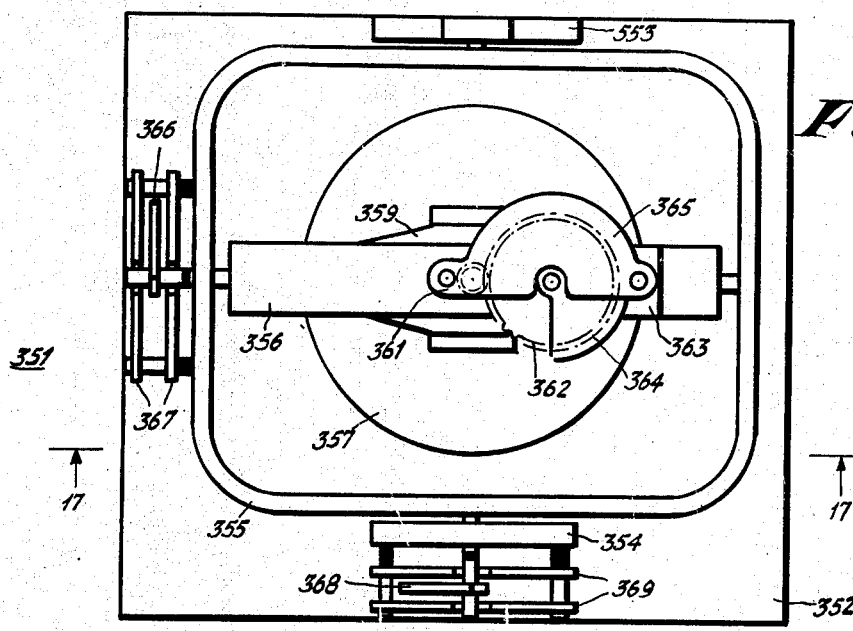
Figure 16 is a top plan view of the gyroscopic unit in the aircraft.
Figure 17:
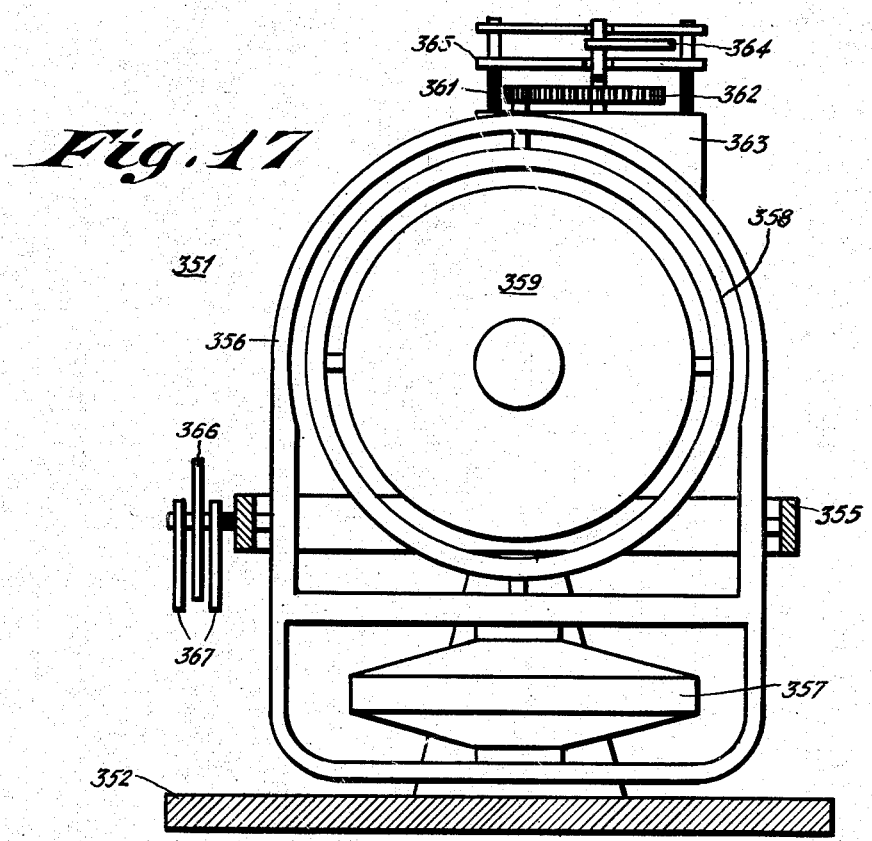
Figure 17 is a front elevation of same.

Mounted in any suitable location in the airplane is a gyroscopic unit 351 which is shown in more detail in Figs. 16 and 17. This unit consists of a base 352 which carries two brackets 553 and 354. Pivotally mounted in these brackets is a horizontal gimbal ring 355 in which is pivoted a vertical frame 356. Rigidly mounted in the base of this frame is a horizontal gyroscopic unit 357. Pivotally mounted in the frame 355 is a vertical gimbal ring 358. Horizontally pivoted in the gimbal ring 358 is a directional gyroscopic unit 359. These gyroscopic units may be constantly driven at a high speed by electrical means in a well-known manner.

Secured to the end of the shaft of the vertical gimbal ring 358 is a pinion 361 which meshes with a gear 362 which is rotatably mounted in a base 363 secured to the frame 356. Mounted upon but insulated from the shaft of the gear 362 is a rotatable condenser plate 364 which moves between two fixed condenser plates 365 which are mounted on but insulated from the base 363. Mounted on but insulated from the shaft of the frame 356 is a movable condenser plate 366 which rotates between two fixed condenser plates 367 mounted upon but insulated from the horizontal gimbal ring 355. Mounted on but insulated from the shaft of the horizontal gimbal ring 355 is a movable condenser plate 368 which rotates between two fixed condenser plates 369 mounted on but insulated from the bracket 354.

Mounted in the airplane is a transmitter 371 which receives energy from a wind-driven generator 372 which is connected to the transmitter through a switch 373. A suitable antenna 374 is provided which is coupled to the transmitter through a transformer 375 (see Fig. 18). This transformer is connected in the output circuit of a high frequency oscillator 376 which is modulated from a source of low frequency oscillations 377 which is connected to the oscillator 376 through a transformer 378.

The output of the oscillator 376 is also modulated through a transformer 381 the primary of which is connected in the output circuits of three space discharge means 382, 383, and 384. The input circuits of these devices are connected to three tuned circuits 385, 386, and 387 which comprise the secondaries of three transformers 388, 389, and 391, and three variable condensers 392, 393, and 394. These condensers are the same as those shown in Figs. 16 and 17 comprising the plates 364–365, 366, 367, and 368–369, respectively. The primaries of the transformers 388, 389, and 391 are connected in the grid circuits of three oscillators 395, 396, and 397.

Figure 19:
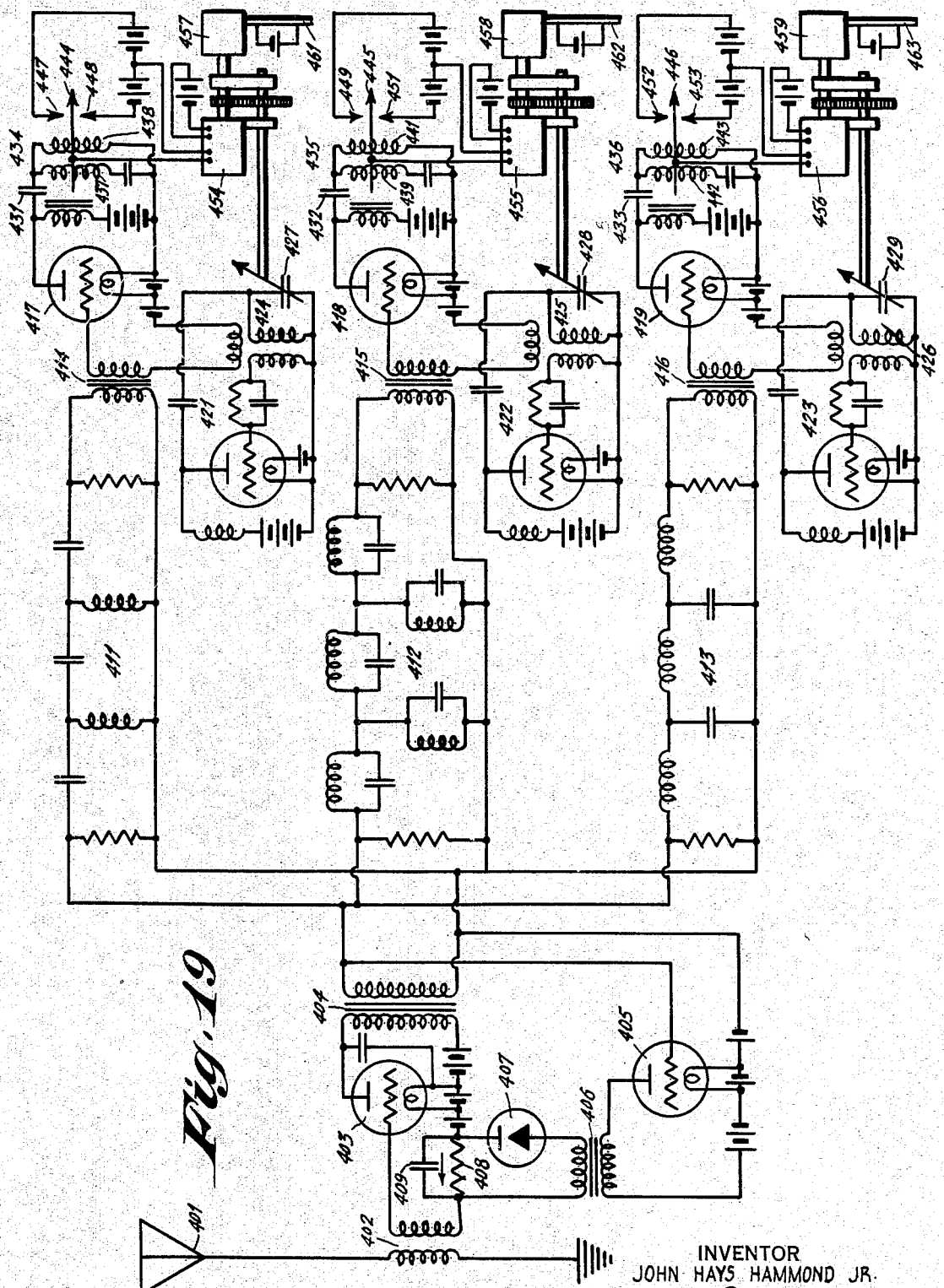
Figure 19 illustrates diagrammatically the circuits that may be used to receive these angles; and, Figure 20 is a front elevation of the instrument board on the aircraft.

For receiving the energy sent from the transmitter 371 the receiving circuit shown in Fig. 19 is located at the landing field 20. This circuit consists of an antenna 401 which is coupled through a transformer 402 to the input circuit of a space discharge means 403. The output circuit of the device 403 is connected through the primary of a transformer 404. Across the secondary of this transformer is connected the input circuit of a space discharge means 405, the output circuit of which includes the primary of a transformer 406. The secondary of this transformer is connected in a circuit including a rectifier 407 and a resistance 408 which is also in the grid return of the device 403. A condenser 409 is shunted across the resistance 408.

Connected to the secondary of the transformer 404 are three filter circuits 411, 412, and 413, which pass high frequency, intermediate frequency, and low frequency currents respectively. These circuits are connected through three transformers 414, 415, and 416 to the input circuits of three space discharge means 417, 418, and 419. The input circuits of these devices are also coupled to three oscillators 421, 422, and 423 which include tuned circuits 424, 425, and 426, comprising three variable condensers 427, 428, and 429.

The output circuits of the devices 417, 418 and 419 are connected through condensers 431, 432, and 433 to three dynamometers 434, 435, and 436, each of which consists of two coils 437–438, 439–441, and 442–443. Each dynamometer is provided with a rotatable armature 444, 445, and 446 which makes contact at certain times with one or the other of two sets of contacts 447–448, 449–451, and 452–453. These contacts are connected through two sets of batteries to three motors 454, 455, and 456 which are mechanically connected to the movable plates of the condensers 427, 428, and 429. The shafts of the motors 454, 455, and 456 are also connected to three electrical transmitters 457, 458, and 459. The transmitters 457 and 458 are connected by cables 461 and 462 to the repeaters 285 and 305 and the transmitter 459 is connected by a cable 463 to a repeater 464 which is mounted on the frame 306. To the shaft of this repeater is secured a worm 465 which meshes with a worm-wheel 466, which is secured to a shaft 467 which has bearings in the frame 306. This shaft is secured to the base plate 307 of the television analyzer. On the front of the casing 321 of this analyzer is mounted a reflector 468 in the center of which is located a lamp 469 for illuminating the model of the landing field.

In Fig. 20 is shown a front view of the instrument board of the airplane. In the center of this board is located the lens 349 in which the picture of the landing field is reproduced. Above this is located the compass 471 and to the left, a standard type of altimeter 472 giving the altitude above sea level. On the right is located a radio-echo altimeter 473 such as that developed by Dr. Alexanderson of the General Electric Company and described in "Science and Invention" for February 1929, pages 952 and 953.

In the operation of this form of the invention, when an airplane 24 approaches the landing field 20, signals are transmitted from the transmitter 371 which comprises three modulation frequencies from the oscillators 395, 396, and 397, which are determined by the settings of the condensers 392, 393, and 394. These condensers, as already described, are mounted on the gyroscopic unit shown in Figs. 16 and 17 and their settings are determined by the relative position of this gyroscopic unit with relation to the three axes of the plane. Thus, if the plane is flying in a straight line and upon a level keel, the three condensers will be set in their mid positions as shown in these figures. This will cause three different frequencies to be impressed upon the oscillator 376, thus causing these modulations of the carrier frequency of the oscillator to be radiated by the antenna 374. The frequency is also modulated by the carrier frequency of the oscillator 377.

These signals will be received by the three direction-finder stations 21, 22, and 23. This reception is accomplished by the loop 45, which picks up the signals which are amplified by the tubes 72 and 79, and are then heard in the phones 81. The two systems of receptions which may be used are either the maximum or the minimum effect with the coil 45. It is found, however, that the minimum effect gives the most accurate results so that system will be described here, though the maximum effect may be used when found to be advantageous.

In the operation of the present invention the coil 45 is initially set so that its plane is vertical and so positioned that the projection on the field of the normal to this plane passing through the center of the coil also passes through the center of the landing field point 37 (Fig. 1).

The other two direction finders are similarly oriented. The three light projectors 127, 128, and 129 in Fig. 4 are also adjusted so that the projection of the beams of light, pass through the center of the field which is indicated by the point 37. The circuits from the three transmitters 67 of the three direction finders 21, 22, and 23 to the three repeaters 105, 106, and 107, are then closed. This is accomplished by closing switches which are not shown, connecting the four wires in each of the three cables 68 to the four wires respectively of each of the three repeaters 105, 106, and 107. At the same time switches are closed which are located adjacent to each direction finder 21, 22, and 23, and which turn on and off the light beams 131, 132, and 133, by closing or opening the circuits through the conductors 201, 202, and 203, brushes 183, 182, and 181, segments 163, 162, and 161 to the brushes 165, thence along shafts 114, casings 118, to lamps 119. The current returns through springs 121, plate 104, segment 164, brush 184, conductor 204, through a battery back to the switches located adjacent to the direction finders.

When an airplane 24 approaches the field 20, signals are transmitted from the airplane as already described, and are received by the three direction finders 21, 22, and 23. The signals received by these direction finders are heard in the head phones 81 and the operator orients the coil 45 by means of the handles 54 and 64, so that a minimum signal is received in the head phones 81. When this condition occurs the plane of the coil is normal to a line from the airplane to the center of the coil. The azimuth angles R. S. T. through which the three coils have been turned from their initial positions are transmitted by the electrical transmitters 67 to the three repeaters 105, 106, and 107, which cause the gears 111, 112, and 113 to be rotated through these angles, thereby turning the three light sources 127, 128, and 129 through the three angles R. S. T. as shown in Fig. 4. The point where the three light beams 131, 132, and 133 intersect on the disc 104 corresponds to the projection 33 of the airplane 24, on the surface of the earth.

The handles 244 and 256 are then manipulated so as to move the slider 239 and turn the plate 104 to such positions that the cross hairs 243 will be over the intersection of the three light beams 131, 132, and 133. As the plane approaches the field and the angles R. S. T. vary the handles 244 and 256 are manipulated so as to keep these cross hairs in registration with the intersections of the beams.

The motion of the slider 239 and the rotation of the disk 104 will be transmitted by means of the electrical transmitters 247 and 257 to the electrical repeaters 294 and 298 (see Fig. 11) which are connected together by means of cables 451 and 452 respectively. These transmitters and repeaters are of well-shown construction and may be such as are fully described in Patent No. 1,431,140, issued October 3, 1922, and indicated in Figures 18, 19, 20, and 21 of said patent. The motion of the repeater 294 causes a rotation of the worm-wheel 292 and pinion 289 which causes the rack 287 to be moved with respect to the member 286 so as to vary the distance between the shafts 281, 295. This distance being maintained proportionally to the distance between the center of the field 37 and the intersection of the cross-hairs 243. The motion of the repeater 298 causes a rotation of the worm-wheel 296 and therefore of the disk 299 so that this disk is rotated through the same angle as the plate 104. The altitude of the airplane may be determined by measuring the angles A. B. C. which are transmitted by the transmitters 57 on the three direction finders 21, 22, and 23 to an airplane range finder system of any well-known design such as that described in the U. S. Patent No. 1,408,504. The angles R. S. T. already referred to are transmitted to this range finder. The altitude of the airplane from the ground, determined therefrom, is transmitted to the repeater 277. This by means of the worm and wheel 276—275 turns the shaft 274 which rotates the gear 273 thus moving the rack 271. This causes the frame 269 to be rolled along the rods 266—267 so that the distance from the lens 323 of the television pickup device to the disk 299 will be the altitude of the airplane on the scale of the model.

As already stated, as long as the airplane maintains a straight flight on an even keel three definite high, intermediate and low frequencies of modulation will be sent out by the transmitter 371. These will be received by the antenna 401 and will be amplified by the amplifier 403 the output of which passes through the transformer 404. Part of this output passes to the input circuit of the device 405, the amplified output of which passes through the transformer 406 and is rectified by the rectifier 407. This rectified current passes through the resistance 408 in the direction of the arrow. This produces a potential difference across this resistance which is proportional to the current flowing through it and therefore to the input signal strength. This potential is added to that of the biasing batteries so that when the signal strength increases the bias on the device 403 will be increased, thereby cutting down its amplification factor. In this way the output of this device is maintained fairly constant so that as the airplane approaches the landing field the energy of the receiver will be maintained fairly uniform thus preventing overloading of this device.

The rest of the output of the transformer 404 passes to the three filter circuits 411, 412, and 413 which allow the high, intermediate and low frequencies to pass, respectively. The high frequency currents then pass through the transformer 414 to the input circuit of the rectifier 417. The ouput of this rectifier passes through the dynamometer 434 where the torque on the armature 444 is proportional to the currents passing through the windings 437 and 438 and to the cosine of the phase difference of these currents. The coil 437 and associated condenser are tuned to the frequency equal to the difference of frequency between that produced by the oscillator 421 of Fig. 19 and the oscillator 395 of Fig. 18, when the condensers 427 and 392 have corresponding settings irrespective of the angular settings of their shafts. When the frequency produced by the rectifier 417 is equal to this difference of frequency, the currents through the two dynamometer windings 437 and 438 are in phase quadrature and no torque is produced on the armature 444.

If, however, the beat frequency is either higher or lower than this particular frequency, then a torque in one direction or the other is produced thereby causing the armature 444 to engage either contact 447 or 448 thus causing the motor 454 to be rotated in one direction or the other which in turn rotates the shaft of the condenser 427 so as to adjust this condenser to produce a frequency which when combined with the frequency produced by the oscillator 395 will produce the desired beat frequency. This reduces the torque on the armature 444 to zero which is then brought back to a central position out of engagement with either contact 447 or 448, thus stopping the rotation of the motor 454. It is thus seen that the shaft of the condenser 427 will be caused to follow the motion of the condenser 392 and in this way transmit the angle through which this condenser has been turned. The shaft of the motor 454 being connected to the transmitter 457 causes the latter to be rotated an amount proportional to the rotation of the condenser 364—365 of the gyroscopic unit 351, this in turn being proportional to the angular displacement between the vertical gimbal ring 358 and the frame 356. The transmitter 457 being connected by the cable 461 to the repeater 285 causes the latter to rotate the worm 284 thereby turning the gear 283 which in turn rotates the member 286. The gear ratios are so produced that they turn the member 286 through the same angle as the directional gyroscope 359 turns with respect to the frame 356. It is thus seen that this member will rotate through an angle equal to the rotation of the projection of the airplane's course in azimuth.

In a similar manner the intermediate and low frequencies which pass through the filters 412 and 413 cause rotation of the condensers 428 and 429 which are driven by the motors 455 and 456. These in turn drive the transmitters 458 and 459, which being connected by the cables 462 and 463 to the repeaters 305 and 464 cause the shafts 302 and 467 to be turned through the same angles as the condensers 366—367 and 368—369.

The shaft 302 causes a rotation of the television pick-up mechanism an amount equal to the angle which the horizontal gimbal ring 355 makes with the vertical frame 356. This angle is the angle at which the airplane is descending so that the optical axis of the television pick-up apparatus is maintained at the same angle with respect to the disk 299 as the airplane is making with respect to the surface of the earth.

The shaft 467 rotates the television pick-up about its optical axis an amount equal to the rotation of the horizontal gimbal ring 355 with respect to the base 352. As this angle is the angle at which the airplane is banked, the television pick-up apparatus will be rotated through the same angle with respect to its normal position thus causing it to be oriented with respect to the disk 299 in the same manner as the airplane is with respect to the surface of the earth.

The scene picked up by the television apparatus will be that seen along the optical axis of the television pick-up apparatus and will correspond to what would be observed by the aviator were he approaching the field and his vision unobscured by fog. The lens 323 will be located in the same position with respect to the model 299 that the airplane is located with respect to the landing field. The image of the model on the disk 312 will be scanned by the rotation of this disk which runs at the speed of the motor 309. This motor also drives the gear 318 which by means of the pinions 316 drives the internal gear 315 and the disc 314 at a reduced speed which in this case is shown as one third the speed of the disc 311. It is thus seen that as the holes 312 in the disc 311 pass in front of the opening 325, only one at a time will be uncovered, due to the spiral slots 314 in the disc 313. In this way each one of the spirally arranged holes 312 on the disk 311 will move across the opening 325, thus scanning the image of the relief map on the disk 299. The light from this map which passes through these holes is then focused by the lens 326 upon the photoelectric cell 327. The fluctuating currents from this cell then pass over the conductors 328 and 329 to the television transmitter 331 which may be of any well-known and standard construction. The output from this transmitter is radiated by the antenna 332.

These radiations are then received by the antenna 341 on the airplane 24 (see Fig. 15) and thence pass to the receiver 344 which is of well-known and standard construction. The output of this receiver passes over the conductors 345 and 346 to the variable light source 347 which fluctuates in accordance with the energy received. The fluctuating light from this source then passes through the optical system and rotating disks of the television reproducer 348 which is similar in construction to the analyzer already described in connection with Figs. 12 and 13. The light of the scanning beam is then transmitted to the lens 349 where an image of a model of the landing field is reproduced in front of the aviator as seen in Fig. 20. The speed of the motor in the television reproducer 348 is controlled by any well-known form of synchronizing apparatus so that it runs in synchronism with the motor 309 of the television analyzer.

It is thus seen that the aviator will constantly have in front of him a view of the landing field as though he were viewing it from the airplane, himself. This picture which he sees takes into account his constantly changing position with respect to the landing field, his altitude above the field, the direction in which the airplane is flying at the moment, the angle at which it is descending, and the angle at which it is banked. He can also ascertain his altitude by means of the radio-echo altimeter 443 which gives him his altitude above the ground within a few feet. It is thus possible for the aviator to make a landing upon the field even though the visibility is so poor that he cannot see ahead of the airplane.

Although only a few of the various forms in which this invention may be embodied have been shown herein, it is to be understood that the invention is not limited to any specific construction, but might be embodied in various forms without departing from the spirit of the invention or the scope of the appended claims.

What is claimed is:

1. In a navigational guide system, a plurality of direction finders, means for actuating the direction finders for determining the position of a craft with respect to a fixed location from signals transmitted from the craft, means for transmitting signals indicative of the orientation of the three fixed principle axes of the craft with respect to earth, means for determining the altitude of the craft with respect to the surrounding terrain and transmitting signals indicative of the altitude of the craft, a relief map of the scenery adjacent the fixed location, an element corresponding to the craft, means actuated in response to the signals indicative of the actuation of the direction finders, the signals indicative of the orientation of the three principle axes of the craft and the signals indicative of the altitude of the craft for displacing the element with respect to the map whereby a course is generated by said element with respect to the map corresponding to the course generated by the craft with respect to the fixed location.

2. In a navigational guide system, a plurality of direction finders for determining the position of a craft with respect to a fixed location, means for transmitting signals indicative of the orientation of the three principle axes of the craft with respect to earth, a means for determining the altitude of the craft with respect to the surrounding terrain and transmitting signals indicative of the altitude of the craft, means for transmitting signals indicative of the actuation of said direction finders, a relief map of the scenery adjacent the fixed location, an element corresponding to the craft, means responsive to said last named signals and to the signals indicative of the orientation of the three principle axes of the craft with respect to earth and the signals indicative of the altitude of the craft for displacing said element with respect to the map whereby a course is traced by said element with respect to said map corresponding to the course traced by the craft with respect to the fixed location and means for transmitting by television a picture of the relief map as viewed from said element to the pilot of the craft.

3. In a navigational guide system, a plurality of direction finders, means for orienting the direction finders in accordance with the position of the craft, means for determining the altitude of the craft with respect to the surrounding terrain, means for determining the angular deviation of the three principle axes of the craft with respect to earth, means responsive to signals indicative of the orientation of the direction finders, said angle determining means and said altitude determining means for reproducing in respect to a relief map the relative course of the craft with respect to its surrounding scene, a television system including a scanning element, and means responsive to the actuation of the last mentioned means for orienting the scanning element with respect to the map to thereby transmit to the craft an image of that part of the map corresponding to the objects on the scene encountered along a predetermined direction from the craft.

4. A navigational guide system comprising in combination with a craft, means for propagating signals from the craft, receiving means located at a distance from the craft and adapted to be actuated so as to determine the direction of said signals, means on the craft for determining the angular deviation of at least two principle axes of the craft with respect to earth, means for generating and transmitting signals indicative of these angles to a receiving means located at a distance from the craft, a relief map of the scenery surrounding the craft, means responsive to the actuation of said receiving means for determining the altitude of the craft and for reproducing in respect to said map the relative course of the craft with respect to the surrounding scene, a television system including scanning apparatus and means responsive to the actuation of said last mentioned means for adjusting the scanning apparatus to thereby transmit from the television system to the craft an image of that part of the map corresponding to the objects on the scene encountered along a predetermined direction from the craft.

5. In an aeronautical guide system, the combination comprising a relief map of the characteristics of the scenery adjacent the landing field, a scanning member, a focusing member disposed with respect to said map in a position corresponding to the position of the aircraft with respect to the landing field and aligned with said scanning member along a predetermined direction, said focusing member being adapted to focus upon said scanning member those images of the map encountered along the said predetermined direction, means responsive to signals corresponding to the position of the craft relative to the field for moving said focusing member relatively with respect to the map whereby a course is generated by said member with respect to said map corresponding to the course generated by the aircraft with respect to the landing field, means for rotating said focusing and scanning members relative to the map about a plurality of axes to follow the rotation of said aircraft about its horizontal and longitudinal axes in accordance with signals transmitted corresponding to deviation of the craft from a standard position, and means for transmitting to the aircraft by television an image of that part of the map corresponding to the object on the scenery encountered along the said predetermined direction from the craft.

6. A system for informing the pilot of a craft from which signals are being propagated his bearings with reference to a fixed location, comprising a plurality of direction finders located adjacent said fixed location and including signal pick-up devices, means for orienting said pick-up devices from a fixed direction in accordance with the direction of the signals emitted from the said craft, whereby said devices will respond to said signals with predetermined characteristics, a rotatable disk, a plurality of light projecting members mounted on said disk and located to correspond respectively to the position of the several direction finders, means for transmitting the motion of said direction finders to their respective light projecting means whereby said projecting members are rotatably responsive to the orientation of said pick-up device whereby the rays emitted from said members meet at a point, an eye piece mounted for observation of said rays, means for effecting a relative parallel displacement of said eyepiece and said disk so that the eye piece may be maintained in registration with the intersection of the light rays, altitude resolving means for determining the vertical position of said craft with respect to the fixed location, angle transmitting means for transmitting signals indicative of the angular deviation of the three axes of the craft from three fixed directions in space and means for reproducing on a miniature scale the generation of the course of the craft with respect to the fixed location in response to signals resulting from the conjoint actuation of said altitude resolving means, said eye piece, said disks, and said angle transmitting means.

7. In a navigational guide system, in combination means for determining the position of a craft with respect to a fixed location, a model of the terrain surrounding said location and an element corresponding to the craft movably disposed with respect to the model, means for determining the altitude of the craft with respect to the ground, means on the craft for transmitting signals indicative of deviations in the line of travel of the craft from a straight line, the angles of descent and bank thereof, and means actuated in response to the actuation of the first named means, said angle transmitting means and the altitude determining means for displacing said element with respect to the model whereby a course is generated by said element with respect to the model corresponding to the course generated by the craft with respect to the fixed location.

8. In a navigational guide system a plurality of direction finders for determining the position of a craft with respect to a fixed location, a model of the terrain surrounding the location and an element corresponding to the craft movably disposed with respect to said model, means for determining the altitude of the craft from signals sent out by the craft, means on the craft for transmitting signals indicative of deviations in the line of travel of the craft from a straight line the angles of inclination and bank thereof said means including a gyroscopic unit and means actuated in response to the actuation of the first named means said angle transmitting means and the altitude determining means for displacing said element with respect to the model whereby a course is generated by the element with respect to the model corresponding to the course generated by the craft with respect to the surrounding terrain.

9. In a television, facsimile or the like transmission system, scanning means therefor, supporting means for the subject to be scanned, supporting means for the scanning means, means for translating the first named supporting means in its own plane and means for moving the first-named supporting means into a second plane which is parallel to the first named plane, means for varying the angular relationship between the optical axis of the scanning means and the first named supporting means, and operable remote control means for controlling the displacement of the said supporting means with respect to one another to thereby permit scanning the subject from different positions as determined by the operation of the remote control means.

10. In an aeronautical guide system, the combination comprising a relief map of the characteristics of a landing field, a scanning member, a focussing member disposed with respect to the map in a position corresponding to the position of the air craft with respect to the landing field and aligned with said scanning member along a direction determined from signals transmitted from the craft to indicate the angle of inclination and angle of bank of the craft, said focussing member being adapted to focus upon said scanning member those images on the map which are along the optical axis of the focussing member, means for moving said focussing member relatively with respect to the map whereby a course is generated by said member with respect to the map which corresponds to the course generated by the air craft with respect to the landing field, means for relatively displacing said scanning member and said focussing member along said predetermined direction so that the models on said map along the predetermined direction will be continuously focussed on the scanning member and means for transmitting to the air craft the image of that portion of the map which is along the optical axis of the focussing member.

11. A system for facilitating the navigation of an air craft which comprises means for transmitting signals from the air craft, a beacon station including a plurality of direction finders dispersed in the various parts of a predetermined area of the earth's surface in the vicinity of the beacon station, means for orienting said direction finders to determine the direction of the signals emanating from the craft, plotting means responsive to the orientation of the direction finders for determining the azimuthal position of the air craft with reference to the beacon station, altitude resolving means for determining the altitude of the air craft above the ground, a relief map of the beacon station and adjacent terrain, picture transmission means including a scanning member, said scanning member being disposed in the same relative position with respect to the map as the air craft is disposed with respect to the beacon station, means responsive to the conjoint actuation of the altitude resolving means and the plotting means for generating a course of said member with respect to the map corresponding to the course of the air craft with respect to the beacon station, said signals transmitted from the air craft having characteristics impressed thereon for indicating the angle of descent and the banking angle of the craft and means controlled by the characteristics of said signals for imparting to the scanning means angular movements with respect to the map proportional to the angle of descent and the banking angle of the craft whereby the optical axis of the scanning means bears the same relation to the map that the optical axis of an observer in the craft bears to the field if he were looking along the line of travel of the craft.

12. In an aeronautical guide system, the combination comprising a map of the characteristics of the scenery adjacent a predetermined fixed point on the earth's surface, a scanning member, a focussing member disposed with respect to the map in a position corresponding to the position of the air craft with respect to the fixed point, said focussing member being adapted to focus upon said scanning member those images of the map encountered along the optical axis of the focussing member, means for moving the focussing member relatively with respect to the map whereby a course is generated by said member with respect to the map corresponding to the course generated by the air craft with respect to the landing field, means controlled by signals transmitted by the craft to indicate the angle of bank and the angle of inclination of the craft for displacing the optical axis of the focussing member relative to the map to correspond to the angles of inclination and bank of the craft and means for transmitting to the air craft an image of that part of the map which is encountered along the optical axis of the focussing member.

13. In a three dimensional navigational guide system, a plurality of direction finders for determining the position of a craft with respect to a fixed location, a plotting mechanism for plotting the position of the craft with respect to said fixed location in accordance with the determinations of said direction finders, a map of the scenery adjacent said fixed location, means including a movable scanning element, positioned with respect to said map in the same relation as regards horizontal projection and elevation as the position of the craft with respect to said location, altitude resolving means for determining the altitude of the craft with respect to ground, means actuated in accordance with the conjoint actuation of the plotting mechanism and the altitude resolving means for displacing said element with respect to the map, means for transmitting from the craft signals indicating the angle of inclination and angle of bank of the craft and means for additionally displacing said element with respect to the map in accordance with said signals whereby the movements of said element with respect to the map correspond to the movements of the craft with respect to the fixed location.

JOHN HAYS HAMMOND, Jr.